United States Patent
Kong et al.

(10) Patent No.: US 12,243,188 B2
(45) Date of Patent: Mar. 4, 2025

(54) IMAGE PROCESSING METHOD AND DEVICE, COMPUTER STORAGE MEDIUM AND TERMINAL

(71) Applicant: SANECHIPS TECHNOLOGY CO., LTD, Guangdong (CN)

(72) Inventors: Dehui Kong, Guangdong (CN); Ke Xu, Guangdong (CN); Xiao Zhang, Guangdong (CN); Hong Wang, Guangdong (CN); Bin Han, Guangdong (CN); Ning Wang, Guangdong (CN); Xin Liu, Guangdong (CN); Guoning Lu, Guangdong (CN); Fang Zhu, Guangdong (CN)

(73) Assignee: SANECHIPS TECHNOLOGY CO., LTD., Guangdong (CN)

( * ) Notice: Subject to any disclaimer, the term of this patent is extended or adjusted under 35 U.S.C. 154(b) by 379 days.

(21) Appl. No.: 17/618,534

(22) PCT Filed: Apr. 16, 2020

(86) PCT No.: PCT/CN2020/085080
§ 371 (c)(1),
(2) Date: Dec. 13, 2021

(87) PCT Pub. No.: WO2020/248706
PCT Pub. Date: Dec. 17, 2020

(65) Prior Publication Data
US 2022/0245761 A1    Aug. 4, 2022

(30) Foreign Application Priority Data

Jun. 14, 2019   (CN) .................. 201910516867.5

(51) Int. Cl.
*G06K 9/00* (2022.01)
*G06T 3/4046* (2024.01)
*G06T 3/4053* (2024.01)

(52) U.S. Cl.
CPC .......... *G06T 3/4053* (2013.01); *G06T 3/4046* (2013.01)

(58) Field of Classification Search
CPC ............................................. G06T 2207/20081
See application file for complete search history.

(56) References Cited

U.S. PATENT DOCUMENTS 9,430,817 B2 *  8/2016  Schelten ............... G06V 10/30
2017/0345130 A1 * 11/2017  Wang .................... H04N 7/0117
(Continued)

FOREIGN PATENT DOCUMENTS

| CN | 107103585 A | 8/2017 |
| CN | 107240066 A | 10/2017 |

(Continued)

OTHER PUBLICATIONS

WIPO, International Search Report issued on Jun. 3, 2020.
(Continued)

*Primary Examiner* — Hadi Akhavannik
(74) *Attorney, Agent, or Firm* — Li & Cai Intellectual Property (USA) Office

(57) ABSTRACT

The present application provides an image processing method, an image processing device, a computer storage medium and a terminal, the image processing method includes: determining convolution kernels of at least two sizes for feature extraction; performing sparsity constraint for the determined convolution kernels of at least two sizes for feature extraction through a preset objective function; and performing feature extraction on an image based on the convolution kernels subjected to the sparsity constraint.

9 Claims, 1 Drawing Sheet

(56) References Cited

U.S. PATENT DOCUMENTS

| | | | | |
|---|---|---|---|---|
| 2017/0347060 A1* | 11/2017 | Wang | .................... | H04N 19/463 |
| 2017/0347061 A1* | 11/2017 | Wang | ..................... | G06N 3/045 |
| 2018/0114097 A1* | 4/2018 | Wang | ..................... | G06N 3/045 |
| 2018/0174031 A1* | 6/2018 | Yang | ....................... | G06N 3/082 |
| 2018/0268257 A1* | 9/2018 | Ren | ......................... | G06T 7/001 |
| 2019/0087725 A1* | 3/2019 | Yang | ........................ | G06N 3/08 |
| 2019/0114743 A1* | 4/2019 | Lund | .................. | G06V 30/1444 |

FOREIGN PATENT DOCUMENTS

| | | |
|---|---|---|
| CN | 108537731 A | 9/2018 |
| CN | 109325915 A | 2/2019 |

OTHER PUBLICATIONS

Fan, Xinxia. "Multi-scale Feature Fusion Network for Image Super-resolution Reconstruction," Master Thesis submitted to Xidian University, Jun. 2018.

\* cited by examiner

IMAGE PROCESSING METHOD AND DEVICE, COMPUTER STORAGE MEDIUM AND TERMINAL

The present application claims priority to the Chinese Patent Application No. 201910516867.5 filed to Chinese Patent Office on Jun. 14, 2019, the entire contents of which are incorporated herein by reference.

TECHNICAL FIELD

The present application relates to the field of computer vision technology, and in particular, to an image processing method, an image processing device, a computer storage medium and a terminal.

BACKGROUND

In contrast to object detection and recognition, a super-resolution method is generally considered as an underlying technology of computer vision. An ideal super-resolution method can effectively 'zoom in' object features without introducing negative factors such as aliasing. When a high-resolution image is processed into a low-resolution image by a fuzzy kernel or a down-sampling factor, information loss generally occurs, and how to recovery the lost information is a core content of the super-resolution method.

Super-resolution methods may be divided into three categories in terms of implementation: a pixel position information based method, a neighborhood statistics characteristics based method and a neural network based method. The pixel position information based method implements information recovery for pixels to be interpolated by constructing a uniform filter, and usually has a result accompanying with loss of image details and has negative effects such as circular spots occurring near intersection points and the like. The neighborhood statistics characteristics based method is generally divided into two parts including statistics characteristics analysis and reconstruction, and can recover the image details, but the performance of such method depends on an expression capability of a dictionary (a collection consisting of atoms in a whole). With the benefit of rapid development of deep learning, neural networks have gained wide attention in the super-resolution methods. Dong et al published a method of Super-Resolution Convolutional Neural Network (SRCNN) on European Conference on Computer Vision (ECCV) in 2014, which performs a feature extraction, a nonlinear mapping, and a reconstruction process on an image to be processed by using a five-layer network. The SRCNN has similarity with sparsity reconstruction in principle, which lays a theoretical foundation for implementing super-resolution reconstruction by adopting a neural network. After the SRCNN published, more super-resolution methods based on neural networks start to emerge, such as a Very Deep network for Super-Resolution (VDSR), an Enhanced Deep Residual Networks for Single Image Super-Resolution (EDSR), a Wide Activation for Efficient and Accurate Image Super-Resolution (WDSR) (EDSR with wider features), and a Retail Collection Attorney Network (RCAN); the VDSR adopts a structure of Residual Neural Network (ResNet), a deeper network structure provides a larger receptive field, and the receptive field has an important significance on the super-resolution method, and an effect of image reconstruction can be improved by deepening the number of network layers; the subsequent super-resolution methods based on the neural network all adopt a deeper network structure than the SRCNN, and although the effect is improved by a deeper-layer network structure, a burden of network computing is also introduced, so that the application of the super-resolution method based on the neural network is limited. The EDSR removes a processing of Residual Blocks (ResBlocks) in a Batch Normalization (BN) layer, and structurally implements shunting from advanced machine vision tasks. The BN layer is not adopted in a framework of the subsequent super-resolution methods. The WDSR expands effective circulation of information by splicing two funnels. The RCAN network implements differentiated treatments on a same convolution layer and increases a weight of effective information by introducing a differential processing mechanism among channels, and achieves the aim of improving the effect. The super-resolution method based on the neural network achieves performance improvement by absorbing improvement in other applications while adopting a more complex model.

The above-mentioned super-resolution method based on the neural network has a problem of receptive field expansion. A large-size convolution kernel being adopted for receptive field expansion will not only lead to an increase of parameters in a square number, but also has a problem of high requirements for network computing power. In view of above problems, the existing technology generally adopts a small-size convolution kernel (currently, a convolution kernel of 3×3 is generally adopted) to perform receptive field expansion, and is implemented by superposing multiple-layer convolution kernels. Although the small-size convolution kernels can be adopted for receptive field expansion, the mode of multiple-layer convolution kernels increases the difficulty of neural network training. In addition, the super-resolution method using the small-size convolution kernel still has the problem of high requirements for network computing power, and the application of the super-resolution method is limited by such defect.

SUMMARY

Embodiments of the present application provide an image processing method, an image processing device, a computer storage medium and a terminal, so as to solve a problem of receptive field expansion of a super-resolution method based on a neural network.

An embodiment of the present application provides an image processing method, including:

determining convolution kernels of at least two sizes for feature extraction;

performing sparsity constraint for the determined convolution kernels of at least two sizes for feature extraction through a preset objective function; and performing feature extraction on an image based on the convolution kernels subjected to the sparsity constraint.

An embodiment of the present application provides an image processing device, including a determining component, a constraint component, and a processing component;

the determining component is configured to determine convolution kernels of at least two sizes for feature extraction;

the constraint component is configured to perform sparsity constraint for the determined convolution kernels of at least two sizes for feature extraction through a preset objective function; and the processing component is configured to perform feature extraction on an image based on the convolution kernels subjected to the sparsity constraint.

An embodiment of the present application further provides a computer storage medium having computer-executable instructions stored therein, the computer-executable instructions, when executed by a computer, perform the image processing method described above.

An embodiment of the present application further provides a terminal, including a memory, and a processor;

the processor is configured to execute program instructions stored in the memory; and the program instructions, when executed by the processor, perform the image processing method described above.

DETAIL DESCRIPTION OF EMBODIMENTS

Embodiments of the present application are described below with reference to the accompanying drawings.

Operations shown in the flowchart of the accompanying drawings may be executed in a computer system such as a set of computer-executable instructions. And, although a logical sequence is shown in the flowchart, in some cases, the operations illustrated or described herein may be performed in an order different from that described here.

Figure 1:
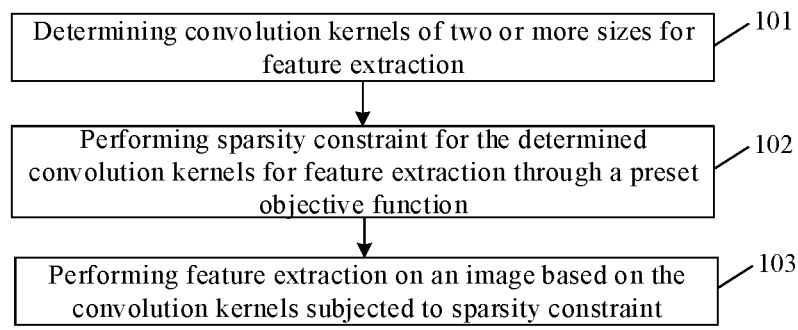
FIG. 1 is a flowchart of an image processing method according to an embodiment of the present application.

FIG. 1 is a flowchart of an image processing method according to an embodiment of the present application, and as shown in FIG. 1, the image processing method includes following operations 101 to 103.

At operation 101, determining convolution kernels of two or more sizes for feature extraction.

In some implementations, the determining convolution kernels of two or more sizes for feature extraction includes:

determining the sizes of the convolution kernels for feature extraction according to a preset strategy of size selection;

determining a number of convolution kernels of each size according to a preset allocation strategy after the sizes of the convolution kernels for feature extraction are determined; and the sizes of the convolution kernels for feature extraction include two or more of following sizes: 3×3, 5×5, 7×7, or 9×9.

In some implementations, the sizes of the convolution kernels for feature extraction in the embodiment of the present application may be added or deleted by a technician according to an effect of a feature processing; in addition, when convolution kernels of various sizes are selected, theoretically, it is common to select and combine small-size convolution kernels into convolution kernels for feature extraction. According to the embodiment of the present application, the sizes of the convolution kernels may be selected according to characteristics of shallow-layer features of an image. The selection of the convolution kernels may refer to the following: the ideal super-resolution method should be localized, that is, there is no interference from an non-overlapping region, the convolution kernel of too small size cannot be used for obtaining region information, and the convolution kernel of too large size may lead to an increase, in a square number, of parameters of a neural network model.

In some implementations, the determining the number of convolution kernels of each size according to the preset allocation strategy includes:

determining the number of convolution kernels of each size according to a strategy of equal-proportion allocation; or determining the number of convolution kernels of each size by taking a scale factor as an allocation basis;

where the taking the scale factor as the allocation basis includes: a proportion of small-size convolution kernels for feature extraction increases along with an increase of the scale factor.

In some implementations, the taking the scale factor as the allocation basis may according to:

a proportion of small-size convolution kernels for feature extraction increases along with an increase of the scale factor, and the number of convolution kernels of each size is determined by combining actual computation experiences.

The following is an example to illustrate the allocation strategy of convolution kernels, assuming that the shallow-layer features of the image to be processed in the example includes 256 output channels, the sizes of selected convolution kernels includes: 3×3, 5×5, 7×7 or 9×9; the convolution kernels of various sizes in embodiment of the present application may be allocated according to two following modes: one, an equal-proportion allocation mode, that is, the number of convolution kernels of each size is 64; second, an allocation mode according to the size of scale factor, including following rules, i.e., the proportion of small-size convolution kernels increases along with the increase of the scale factor, the convolution kernels of various sizes is allocated according to the size of scale factor, and taking relatively large scale factors into consideration so that interpolation pixels pay more attention to information of pixels adjacent thereto. Here, the scale factor refers to a pixel ratio at which an image changes from a high resolution support to a low resolution size.

At operation 102, performing sparsity constraint for the determined convolution kernels for feature extraction through a preset objective function.

The existing art considers performing sparsity constraint for the shallow-layer features from an aspect of feature fusion, a result with better detailed features is recovered by virtue of a few effectively characterized atoms according to experiences based on sparsity reconstruction. But such sparsity constraint is not applicable to the last few layers of the neural network (the fifth convolutional layer and beyond), because high-level semantic features are usually represented as a synthesis of a variety of information.

In some implementations, the objective function in the embodiment of the present application includes:

in response to determining an output result of the neural network and a ground truth meet a preset condition based on a norm, the objective function performs constraint on sparsity of convolution kernels of a network layer under a corresponding channel through a sparsity function.

In some implementations, the objective function includes:

$$\min_W \left( \frac{1}{2} \| Y - W(x) \|^1 \right), \text{ s.t.} \| W_{i,j} \|_0 \leq k_{i,j};$$

$$\min_W \left( \frac{1}{2} \| Y - W(x) \|^2 \right), \text{ s.t.} \| W_{i,j} \|_0 \leq k_{i,j};$$

where Y represents the ground truth (GT), W(x) represents the output result of the neural network, $W_{i,j}$ represents an element of a j-th convolution kernel of an i-th layer, $\|\bullet\|_0$ represents a zero norm, that is, the number of nonvanishing elements; $k_{i,j}$ represents the sparsity of the j-th convolution kernel of the i-th layer under the corresponding channel; and $$\min_{W}(A), s \cdot t\|B\|_0$$

represents solving a minimum value of expression A in response to that constraint B is met, where i and j are positive integers.

In some implementations, the determining the output result of the neural network and the GT meet the preset condition based on the norm may include: determining the output result of the neural network is nearly equal to a value of the GT based on L2 norm and L1 norm. In addition, referring to the above objective function, the embodiment of the present application may refer to logical relationships of the function and adopt other types of norms to design and implement a function having the same function as the above objective function.

In some implementations, the method in the embodiment of the present application further includes training the preset objective function by at least one of following methods:

a method of separation of variables, or a method of stochastic gradient descent (SGD).

In some implementations, the embodiment of the present application may perform the training of the objective function by the method of separation of variables or the method of SGD. After each back propagation process is completed, a processing of sparsity is added.

$$w_{i,j,l} = \begin{cases} w_{i,j,l} & |w_{i,j,l}| \geq m \\ 0 & \text{else} \end{cases}$$

where $w_{i,j,l}$ represents an j-th element of the j-th convolution kernel of the i-th layer, and m represents an absolute value of the j-th element in an array in which absolute values of the j-th convolution kernel of the i-th layer are sorted from large to small.

At operation 103, performing feature extraction on an image based on the convolution kernels subjected to the sparsity constraint.

In some implementations, the performing feature extraction on the image based on the convolution kernels subjected to the sparsity constraint includes: deploying the determined convolution kernels to a neural network, and performing feature extraction on the image through the neural network.

In some implementations, the performing feature extraction on the image based on the convolution kernels subjected to the sparsity constraint includes:

deploying the convolution kernels which are subjected to the sparsity constraint through the objective function to an acceleration platform executing the neural network or an accelerator executing the neural network; and performing feature extraction on the image through the convolution kernels deployed on the acceleration platform or the accelerator.

In embodiment of the present application, by performing sparsity constraint for the convolution kernels of two or more sizes constrained by the objective function, and then deploying the convolution kernels to the acceleration platform or the accelerator (including an optimization accelerator), the problem of receptive field expansion based on the neural network is solved; the embodiment of the present application can provide a sparsity parameter when the neural network is deployed, so that invalid computation can be skipped over for the accelerator or a graphics processing unit (GPU), an expectation for network computing power can be reduced while the receptive field is expanded by reasonably setting the sparsity parameter, and a super-resolution processing of 8K or even larger size can be effectively supported.

In embodiment of the present application, the features extracted by convolution kernels of different sizes contain receptive fields of different sizes, and a foundation is provided for improving an effect of a subsequent feature processing. According to a correlation principle, it is desirable to perceive different scales for different point-line features, receptive fields which conform to corresponding scales can better embody characteristics of the shallow-layer features; the super-resolution method based on the neural network adopts a normalized 3×3 receptive field to implement modification of incomplete features in a subsequent information fusion process. The embodiment of the present application considers a situation of expecting receptive fields of various sizes in a stage of feature extraction, which reduces a pressure in a subsequent stage of feature fusion, and is beneficial for improving a performance of the network. The super-resolution method based on the neural network in the embodiment of the present application has a network model more in line with principles of human body perception. Sparse convolution kernels in the present application can implement an adjustment for sparsity of the convolution kernels in a training process, and the training process of the network may be accelerated by more finely adjusting parameters of the network. Although the neural network designed by the embodiment of the present application has a larger-size convolution kernel, through the sparsity constraint for the convolution kernels, the number of effective computations is not obviously increased. The expectation for computing power of the super-resolution method can be reduced through reasonable designs of a GPU program and a special hardware accelerator. By constraining the shallow-layer features during the fusion process, a proportion of zero-value elements in a feature map is increased, the number of effective computations can be reduced, which is favorable for deployment of the method in the embodiment of the present application or is favorable for processing of an amplification of higher resolution (such as 8K); that is, the method of the embodiment of the present application has stronger affinity to an acceleration equipment with schemes such as zero-value optimization.

In addition to the part of feature extraction, the super-resolution method based on the neural network in the embodiment of the present application further includes: information fusion and reconstruction. The embodiment of the present application adopts sparse convolution kernels. After performing the feature extraction of corresponding receptive fields on an input low-resolution image, feature fusion can be performed by means of an information fusion method in the existing art, for example, ResBlock sub-modules similar to those in the EDSR may be selected for a fusion processing, and the extracted features are fused by referring to a correlation theory by cascading several ResBlock sub-modules; during the fusion processing, a multi-level skip connection mode may be adopted to implement transmission of feature data, the multi-level skip connection mode can concurrently improve a convergency speed of the network model. The final part of reconstruction includes a change of size of the image and a convolution of last layer. An increase of the size of the image may be achieved by adopting a transposed convolution method or a shuffle method in the existing art. Since the network model designed by the present application relates to the sparse convolution kernels, it is desirable to modify the training mode. Current deep neural network training methods, such as the method of SGD, a method of Adaptive Moment Estimation (ADAM), etc., all use a principle of back propagation to modify a value of each weight by performing a layer-by-layer backward derivation according to a difference between an output result based on a preset weight and a minimum objective function. The model designed by the present application substantially adds a constraint on a model weight, that is, a minimization of the objective function is ensured while it is desirable to make the sparsity of the convolution kernel meet certain conditions. Such constraint on the sparsity may adopt different methods of separation of variables, such as a half-quadratic spiltting method, an alternating direction method of multiple (ADMM), or the like.

The sparse convolution kernels adopted by the embodiment of the present application facilitate implementation of the feature extraction under a relatively large receptive field. In order to achieve a higher acceleration ratio, the above processing process may be executed on a GPU acceleration or a specific hardware accelerator which performs processing on multiplying by 0, the embodiment of the present application would not increase a pressure of model deployment while implementing receptive field expansion. The network model obtained by training according to the embodiment of the present application has a higher sparsity of the convolution kernel, and thus has a larger optimization space, sparsity parameters can be determined based on the method of the embodiment of the present application, and a higher acceleration ratio can be achieved for a hardware system with a higher convolution optimization degree.

The technical solution of the present application includes: determining convolution kernels of two or more sizes for feature extraction; performing sparsity constraint for the determined convolution kernels for feature extraction through a preset objective function; and performing feature extraction on an image based on the convolution kernels subjected to the sparsity constraint. The embodiment of the present application is based on two or more convolution kernels, implements the receptive field expansion while reducing a training difficulty of the neural network and the network computing power, and provides a technical support for the application of the super-resolution method based on the neural network.

Figure 2:
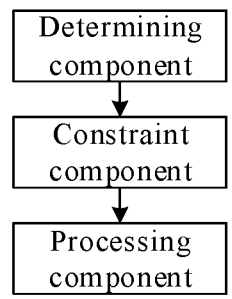
FIG. 2 is a block diagram of an image processing device according to an embodiment of the present application.

FIG. 2 is a block diagram of an image processing device according to an embodiment of the present application, and as shown in FIG. 2, the image processing device includes a determining component, a constraint component, and a processing component;

the determining component is configured to determine convolution kernels of two or more sizes for feature extraction.

In some implementations, the determining component is configured to:

determine sizes of the convolution kernels for feature extraction according to a preset strategy of size selection;

determine a number of convolution kernels of each size according to a preset allocation strategy after the sizes of the convolution kernels for feature extraction are determined; and the sizes of the convolution kernels for feature extraction include two or more of following sizes: 3×3, 5×5, 7×7, or 9×9.

In some implementations, the determining component is configured to determine the number of convolution kernels of each size according to the preset allocation strategy includes:

determining the number of convolution kernels of each size according to a strategy of equal-proportion allocation; or determining the number of convolution kernels of each size by taking a scale factor as an allocation basis;

the taking the scale factor as the allocation basis includes: a proportion of small-size convolution kernels for feature extraction increases along with an increase of the scale factor.

The constraint component is configured to perform sparsity constraint for the determined convolution kernels for feature extraction through a preset objective function.

In some implementations, the objective function includes:

in response to determining an output result of the neural network and a ground truth meet a preset condition based on a norm, the objective function performs constraint on sparsity of convolution kernels of a network layer under a corresponding channel through a sparsity function.

In some implementations, the objective function includes:

$$\min_{W}\left(\frac{1}{2}\|Y - W(x)\|^1\right), \text{s.t.} \|W_{i,j}\|_0 \le k_{i,j};$$

$$\min_{W}\left(\frac{1}{2}\|Y - W(x)\|^2\right), \text{s.t.} \|W_{i,j}\|_0 \le k_{i,j};$$

where Y represents the ground truth (GT), W(x) represents the output result of the neural network, $W_{i,j}$ represents an element of a j-th convolution kernel of an i-th layer, $\|\cdot\|_0$ represents a zero norm, that is, the number of nonvanishing elements; $k_{i,j}$ represents the sparsity of the j-th convolution kernel of the i-th layer under the corresponding channel;

$$\min_{W}(A), s \cdot t \|B\|_0$$

represents solving a minimum value of expression A in response to that constraint B is met, where i and j are positive integers.

In some implementations, the constraint component is further configured to train the preset objective function by at least one of following methods:

a method of separation of variables, or a method of SGD.

The processing component is configured to perform feature extraction on an image based on the convolution kernels subjected to the sparsity constraint.

In some implementations, the processing component is configured to:

deploy the convolution kernels subjected to the sparsity constraint through the objective function to an acceleration platform of executing a neural network or an accelerator of executing a neural network; and performing feature extraction on the image through the convolution kernels deployed on the acceleration platform or the accelerator.

An embodiment of the present application further provides a computer storage medium having computer-executable instructions stored therein, the computer-executable instructions, when executed by a computer, perform the image processing method described above.

An embodiment of the present application further provides a terminal, including:

a memory, and a processor;

the processor is configured to execute program instructions stored in the memory; and the program instructions, when executed by the processor, perform the image processing method described above.

All or some of the operations in the method, the functional modules/components in the system and the device disclosed above may be implemented as software, firmware, hardware, or suitable combinations thereof. In a hardware implementation, the division between the functional modules/components stated above is not necessarily corresponding to the division of physical components; for example, one physical component may have a plurality of functions, or one function or operation may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, the computer-readable medium may include computer storage medium (or non-transitory medium) and communication medium (or transitory medium). The computer storage medium includes volatile/nonvolatile and removable/non-removable medium used in any method or technology for storing information (such as computer-readable instructions, data structures, program modules and other data). The computer storage medium include, but not limited to, a Random Access Memory (RAM), a Read-Only Memory (ROM), an Electrically Erasable Programmable Read-Only Memory (EEPROM), a flash memory or other memory techniques, a Compact Disc Read-Only Memory (CD-ROM), a Digital Video Disk (DVD) or other optical discs, magnetic cassettes, magnetic tapes, magnetic disks or other magnetic storage devices, or any other medium which can be used to store the desired information and can be accessed by a computer. The communication medium generally includes computer-readable instructions, data structures, program modules or other data in a modulated data signal, such as a carrier wave or other transmission mechanism, and may include any information delivery medium.

What is claimed is:

1. An image processing method, comprising:
   determining convolution kernels of at least two sizes for feature extraction;
   performing sparsity constraint for the determined convolution kernels of at least two sizes for feature extraction through a preset objective function; and
   performing feature extraction on one convolutional layer of an image based on the convolution kernels of at least two sizes subjected to the sparsity constraint, wherein at least two sizes of the convolution kernels for feature extraction comprise at least two of following sizes: 3×3, 5×5, 7×7, or 9×9,
   wherein the determining the convolution kernels of at least two sizes for feature extraction comprises:
   determining at least two sizes of the convolution kernels for feature extraction according to a preset strategy of size selection;
   determining a number of convolution kernels of each size of the at least two sizes according to a preset allocation strategy after the at least two sizes of the convolution kernels for feature extraction are determined,
   wherein the determining the number of convolution kernels of each size of the at least two sizes according to the preset allocation strategy comprises:
   determining the number of convolution kernels of each size of the at least two sizes by taking a scale factor as an allocation basis;
   wherein the taking the scale factor as the allocation basis comprises: a proportion of small-size convolution kernels for feature extraction increases along with an increase of the scale factor,
   wherein the scale factor is a pixel ratio at which the image changes from a high resolution to a low resolution.

2. The method of claim 1, wherein the determining the number of convolution kernels of each size according to the preset allocation strategy comprises:
   determining the number of convolution kernels of each size according to a strategy of equal-proportion allocation.

3. The method of claim 1, wherein the preset objective function comprises:
   in response to determining an output result of a neural network and a ground truth meet a preset condition based on a norm, the preset objective function performs constraint on sparsity of convolution kernels of a network layer under a corresponding channel through a sparsity function.

4. The method of claim 3, wherein the preset objective function comprises:

$$\min_{W}\left(\frac{1}{2}\|Y - W(x)\|^1\right), \text{ s.t.} \|W_{i,j}\|_0 \leq k_{i,j};$$

$$\min_{W}\left(\frac{1}{2}\|Y - W(x)\|^2\right), \text{ s.t.} \|W_{i,j}\|_0 \leq k_{i,j};$$

wherein Y represents the ground truth, W(x) represents the output result of the neural network, $W_{i,j}$ represents an element of a j-th convolution kernel of an i-th layer, $\|\bullet\|_0$ represents a zero norm; $k_{i,j}$ represents the sparsity of the j-th convolution kernel of the i-th layer under the corresponding channel; and $$\min_{W}(A), s \cdot t \|B\|_0$$

represents solving a minimum value of expression A in response to that constraint B is met, wherein i and j are positive integers.

5. The method of claim 3 further comprises: training the preset objective function by at least one of following methods:
   a method of separation of variables, or a method of stochastic gradient descent.

6. The method of claim 1, wherein the performing feature extraction on the image based on the convolution kernels subjected to the sparsity constraint comprises:
   deploying the convolution kernels subjected to the sparsity constraint through the preset objective function to an acceleration platform of executing a neural network or an accelerator of executing a neural network; and
   performing feature extraction on the image through the convolution kernels deployed on the acceleration platform or the accelerator.

7. An image processing device, comprising: a determining component, a constraint component, and a processing component; wherein, the determining component is configured to determine convolution kernels of at least two sizes for feature extraction;

the constraint component is configured to perform sparsity constraint for the determined convolution kernels of at least two sizes for feature extraction through a preset objective function; and the processing component is configured to perform feature extraction on one convolutional layer of an image based on the convolution kernels of at least two sizes subjected to the sparsity constraint, wherein at least two sizes of the convolution kernels for feature extraction comprise at least two of following sizes: 3×3, 5×5, 7×7, or 9×9, wherein the determining component determines the convolution kernels of at least two sizes for feature extraction comprises:

at least two sizes of the convolution kernels for feature extraction are determined according to a preset strategy of size selection;

a number of convolution kernels of each size of the at least two sizes is determined according to a preset allocation strategy after the at least two sizes of the convolution kernels for feature extraction are determined, wherein the number of convolution kernels of each size of the at least two sizes is determined according to the preset allocation strategy comprises:

the number of convolution kernels of each size of the at least two sizes is determined by taking a scale factor as an allocation basis;

wherein the taking the scale factor as the allocation basis comprises: a proportion of small-size convolution kernels for feature extraction increases along with an increase of the scale factor, wherein the scale factor is a pixel ratio at which the image changes from a high resolution to a low resolution.

8. A non-transitory computer storage medium having computer-executable instructions stored therein, the computer-executable instructions, when executed by a computer, perform the image processing method of claim 1.

9. A terminal, comprising: a memory, and a processor; wherein, the processor is configured to execute program instructions stored in the memory; and the program instructions, when executed by the processor, perform the image processing method of claim 1.

\* \* \* \* \*